United States Patent Office 3,484,392
Patented Dec. 16, 1969

3,484,392
POLYURETHANE FOAM COMPOSITIONS
David Jankiel Wluka, Melbourne, Victoria, Australia, assignor to Imperial Chemical Industries of Australia and New Zealand Limited, Melbourne, Victoria, Australia, a corporation of Victoria, Australia
No Drawing. Filed Aug. 25, 1966, Ser. No. 574,944
Int. Cl. C08g 22/44
U.S. Cl. 260—2.5          6 Claims

ABSTRACT OF THE DISCLOSURE

A new polyurethane foaming composition is provided having a pore size controlling additive which is a copolymer of at least one unsaturated compound A and a copolymerisable derivative B of a mono- or diprotic unsaturated acid, at least one of which compounds A and B comprises one or more aliphatic substituent having 4 or more carbon atoms and at least one of which compounds A and B comprises one or more polyoxyalkylene residues terminated by an alkyl, aryl, aralkyl or acyl group.

---

The present invention relates to new compositions comprising copolymers of polyoxyalkylene derivatives of unsaturated acids and in particular to plastic foaming compositions comprising these copolymers.

Accordingly we provide a new polyurethane foaming composition comprising a pore size controlling additive which is a copolymer of at least one unsaturated compound A and a copolymerisable derivative B of a mono- or diprotic unsaturated acid, at least one of which compounds A and B comprises one or more aliphatic substituent having 4 or more carbon atoms and at least one of which compounds A and B comprises one or more polyoxyalkylene residues terminated by an alkyl, aryl, aralkyl or acyl group.

The compound A may be represented by the formula $$R^4\text{-}C\text{-}R^2$$
$$R^3\text{-}C\text{-}Y_a{}^1\text{—}G_b{}^1\text{—}R^1 \quad \text{(Formula A)}$$

In Formula A, indices $a$ and $b$, which may be the same or different, are 0 or 1; $Y^1$ which may be present (when $a=1$) or absent (when $a=0$) is an alkylene bridge; —$G^1$— which may be present (when $b=1$) or absent (when $b=0$) is —O—,

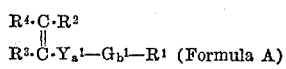

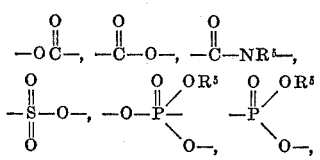

$R^2$, $R^3$ and $R^4$, which may be the same or different and at least one of which is hydrogen, and not more than one or different, are 0 or 1; $Y^1$ which may be present ( when hydrocarbon radical. In addition, whenever —$G^1R^1$ stands for

or

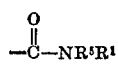

$R^2$ may also stand for

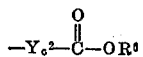

or

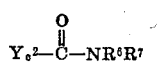

and whenever $a=0$ and —$G^1R^1$ stands for

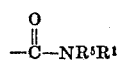

$R^2$ may also stand for

and $R^5$ then stands for a direct bond to the latter thus forming an imide of a dicarboxylic acid having the formula

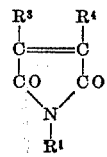

$Y^2$ is an alkylene bridge and index $c$ is 0 or 1. Furthermore whenever $R^2$ and $R^4$ stand for hydrogen, $R^3$ may also stand for —$CH_2CONR^8R^9$ or —$CH_2\cdot COOR^9$. $R^1$, $R^5$, $R^6$, $R^7$, $R^8$ and $R^9$, which may be the same or different, are hydrocarbon radicals. Each hydrocarbon radical is selected from the group consisting of alkyl, alkenyl, cycloalkyl, aryl, alkaryl and aralkyl; they are illustrated by radicals such as mehtyl, ethyl, isopropyl, 2-ethylhexyl, cycloalkyl, aryl, alkaryl and aralkyl; they are illustrated ethyl, naphthyl, tertiary butyl, etc. Preferred $GR^{11}$ is

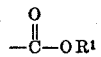

preferred $Y^1$ is —$CH_2$—; preferably at least one hydrocarbon $R^1$, $R^5$, $R^6$, $R^7$, $R^8$, or $R^9$ is a long chain alkyl group which is defined as a group comprising at least 4, more preferably at least 8 and most preferably at least 12 carbon atoms; preferred $R^2$, $R^3$ and $R^4$ are hydrogen $r$ alkyl groups having 1 to 3 carbons.

Suitable monomers comprising at least one preferred long chain alkyl group are e.g.

Olefines

| | |
|---|---|
| hexadecene-1 | hexene-1 |
| octadecene-1 | octene-1 |
| 3-phenylhexadecene-1 | decene-1 |
| p-octylstyrene | diisobutene-1 |
| 2-hexadecylbutadiene-1,3 | dodecene-1 |

Ethers allyl 4,4,8,8-tetramethyldocosyl ether
methallyl octadecyl ether
isopropenyl dodecyl ether
dodecyl vinyl ether
cetyl vinyl ether
1-eicosenyl decyl ether
vinyl p-octylphenyl ether
1-decenyl p-cetylphenyl ether

Esters vinyl butyrate
vinyl 2-ethylhexanoate
vinyl palmitate
vinyl oleate
allyl oleate
allyl palmitate
allyl stearate
ally esters of lard acids
methallyl palmitate
cyclohexyl 2-dodecenoate
p-isoamylphenyl 2-hexadecenoate
4-p-butyltolyl 2-octadecenote
5-ethyldocosyl crotonate
octadecyl isocrotonate
n-butyl-2-eicosenoate
p-tert. amylphenyl octadecyl maleate
p-hexadecylphenyl 2-ethyl-hexyl maleate
o-tolyl 2-octadecylcyclohexyl maleate
o-nonylphenyl-hexadecyl maleate
dihexadecyl maleate
n-butyl acrylate
lauryl acrylate
stearyl acrylate
dodecyl acrylate
dihexyl fumarate
dioctyl fumarate
di-dodecyl maleate
di-dodecyl mesaconate
di-dodecyl citraconate
benzyl octadecyl itaconate
di-hexadecyl itaconate
isopropenyl palmitoleate
1-decenyl laurate
1-hexadecenyl myristate
allyl lauryl prop-2-enyl phosphonate The copolymerisable derivative B of a mono- or diprotic, unsaturated acid may be presented by the formula:

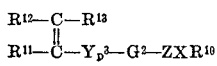
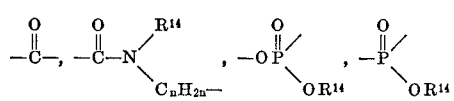 (Formula B)

In Formula B, $G^2$ is

or

Whenever —$G^2$— stands for

or

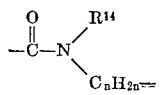

$R^{13}$ may also stand for

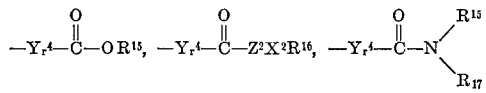

or

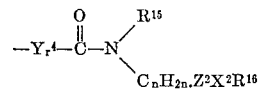

furthermore when —$Y_p^3$—$G^2$ stands for

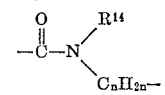

$R^{13}$ may be

and $R^{14}$ is then a direct bond linking the latter to form a cyclic imide of the formula

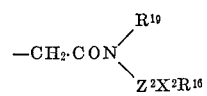

Indices $p$ and $r$, which may be the same or different, are 0 or 1, i.e. $Y^3$ and $Y^4$ may be absent or present; index $n$ is an integer from 1 to 5, e.g. the same as in Z; $Y^3$ and $Y^4$, which may be the same or different, the alkylene bridges; Z and $Z^2$, which may be the same or different, are polyoxyalkylene residues $(OC_mH_{2m})_q$ more closely defined below, each of which may be a linear or branched homopolymer, a random copolymer or a block copolymer optionally modified by grafting a polyvinyl ester or polymethacrylic ester homopolymer or copolymer on to said polyoxyalkylene residue, X and $X^2$, which may be the same or different, stand for —O— or —$NR^{18}$—; $R^{14}$, $R^{15}$, $R^{17}$, $R^{18}$, $R^{19}$ and $R^{20}$, which may be the same or different, are hydrocarbon radicals; $R^{11}$, $R^{12}$ and $R^{13}$, which may be the same or different, are hydrogen or hydrocarbon radicals, provided however that at least one of them is hydrogen and not more than one of them is aryl or cycloalkyl; $R^{10}$ and $R^{16}$ are alkyl, aryl, cycloalkyl, aralkyl or acyl groups and whenever $R^{12}$ and $R^{13}$ are hydrogen, $R^{11}$ may also be —$CH_2COOR^{19}$, —$CH_2 \cdot CONR^{19}R^{20}$ —$CH_2 \cdot COOZ^2X^2R^{16}$ or

Preferred hydrocarbon radicals are the $C_1$ to $C_3$ alkyl radicals; preferred group $R^{12}$ is hydrogen and preferred $R^{11}$ is hydrogen or methyl, preferred $G^2$ is $$-\overset{O}{\underset{\|}{C}}-$$

and $Y^3$ is preferably —$CH_2$— or absent.

For any combination of co-mers A and B at least one of the hydrocarbon radicals $R^1$, $R^5$, $R^6$, $R^7$, $R^8$, $R^9$, $R^{14}$, $R^{15}$, $R^{17}$, $R^{18}$, $R^{19}$ and $R^{20}$ must be a long chain alkyl radical as above defined. While the presence of at least one such long chain alkyl group is essential to our invention in that it imparts the non-polar properties to the copolymers, the choice of the other radicals, of $G^1$ and of the optional alkylene bridges $Y^1$ and $Y^2$ is not highly critical; it is largely a matter of convenience; thus certain of the compounds within the scope of the Formulae A and B are operative but less readily synthesised and/or polymerised while others are commercially available monomers.

The —$XR^{10}$ group may be for example an alkoxy radical such as methoxy, ethoxy, propoxy, butoxy, octyloxy, octadecyloxy; a cycloalkoxy or arylalkoxy radical such as cyclohexyloxy, benzyloxy; an aryloxy radical such as phenoxy; an amine residue such as dimethlamino, diethylamino, phenylmethylamino, morpholino; or a carboxylic acid residue such as acetyloxy, benzoyloxy or an amide residue such as N-methylbenzamido or N-methylacetamido.

Suitable α-β unsaturated monocarboxylic acids from which esters containing the Z group or the long chain alkyl group $R^1$ may be formed are e.g. acids of the general formula

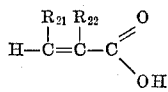

where $R^{21}$ and $R^{22}$, which may be the same or different, are H or an alkyl group having 1 to 4 carbons. Representative acids of this type, any one or more of which can be employed in forming the copolymers, are acrylic, methacrylic, crotonic, tiglic, angelic, α-ethylacrylic, α-methylcrotonic, α-ethylcrotonic, α-propylcrotonic, α-butylcrotonic, hydrosorbic, α-ethylhydrosorbic and α-propylhydrosorbic acids, and the like. A more preferred group of acids for use in the present invention comprises those of the above formula which contain a total of from about 3 to 8 carbon atoms in the molecule, as represented by all except the last-named of the acids listed above. A still more preferred group of acids is made up of acrylic and methacrylic acids.

α-β unsaturated dicarboxylic acids suitable for making di-esters or -amides or esteramides comprising a long chain alkyl group or a group —$ZXR^{10}$ containing the polyalkylene oxide residue Z as defined include maleic, fumaric, itaconic, citraconic, mesaconic acids. A preferred group of dicarboxylic acids comprises those which contain a total of from about 4 to 8 carbon atoms in the molecule. Still more prefered are maleic acid and fumaric acid.

Suitable proportions of polyoxyalkylene residues range from 15 to 70 percent of the total weight of the copolymeric additive; for best performance the narrower range from 25 to 50% by weight as defined above is preferred; when the polyoxyalkylene group consists of different units ($OC_mH_{2m}$), polyoxyalkylene residue consisting of 50% or more of ethylene oxide units are preferred within the above stated ranges; when the polyoxylaklyene group comprises 70% or more of propylene oxide or butylene oxide units or combinations thereof, it is preferred that the weight of the polyoxyalkylene group is between 40 and 70% of the copolymeric additive. It is understood that within small changes of ratios of the various constituents the improvement in foam properties is gradual and depends also on the specific polyurethane ingredients used; hence these limits are not acutely or abruptly critical.

Suitable proportions of the long chain alkyl group ranges from 10 to 60% and, for best performance, from 20 to 50% by weight of the copolymeric additive.

In practice particularly effective and economic pairs of copolymers A and B are the copolymers of methacrylates and fumarates comprising in each pair at least one long chain alkyl group as defined and an ester of polyalkyleneglycol group —$ZXR^{10}$ as defined. Other effective and economic combinations are the copolymers of a long chain alkyl ester of acrylic or methacrylic acid (co-mer A) with an acrylic or methacrylic acid ester (co-mer B) of a polyalkyleneglycol group —$ZXR^{10}$ as defined above. The unsaturated acid of the co-mers A and B may be the same or different. As implied about it is not critical whether the ester group —$ZXR^{10}$ is attached to the acid residue of a monocarboxylic or dicarboxylic acid, as long as there is at least one long chain alkyl group present in one of the co-mers; it is even possible to form a mixed ester of a dibasic acid having both the non-polar group and the —$ZXR^{10}$ group attached to one acid molecule.

Optionally our copolymers may comprise copolymerisable mer-units other than those defined in Formula A and B e.g. ethyl acrylate, methyl methacrylate, ethyl methacrylate, propyl methacrylate, propyl acrylate, vinyl acetate, acrylonitrile, α-olefins including styrene, vinylidene chloride or even vinyl chloride, provided that they do not contain groups reacting with the isocyanate groups of the polyurethane ingredients in sufficient quantity to chemically bind substantial proportions of our copolymers. Thus copolymers containing substantial proportions of active hydrogen groups are unsuitable because of their reaction with the isocyanate group. Up to 30 mole percent of the total monomers forming the copolymeric additive may be derived from such co-mers C.

The polyoxyalkylene residues in our copolymers may be linear or branched and comprise —$(OC_mH_{2m})_q$— units, where $q$ is a positive integer, preferably greater than 5, and $m$ is an integer from 1 to 5, preferably 2 to 4. It is, of course, possible and in some cases may be desirable that $m$ should have different values in the same block. Alkylene groups which may be present include, for example, ethylene, 1,2-propylene, 1,3-propylene, 1,2-butylene and 1,4-butylene. The end of the polyoxyalkylene blocks is formed by the alkylene-oxide-reactive group $R^{10}$. These polyoxyalkylene blocks may be derived from polyoxyalkylene polymers prepared in known manner.

In the case of linear polyoxyalkylene residues Z equals —$(OC_mH_{2m})_q$—. Suitable linear hydroxy-containing polyoxyalkylene polymers may be prepared, for example, by the polymerisation of an alkylene oxide in the presence of a basic catalyst, such as potassium hydroxide, on to a polymer of n unsaturated mono- or di-carboxylic acid or its derivative bearing a group capable of reacting with alkylene oxide, e.g. a carboxyl, a hydroxyl or primary or secondary amine group. Alternatively branched hydroxy-containing polymers containing more than one residue Z may be prepared by the condensation of an alkylene oxide in the presence of a basic catalyst on to a polymer containing co-mer units bearing more than one active hydrogen atom per co-mer unit, e.g. copolymers bearing primary amino and/or polyhydroxy groups such as those derived from ammonia, glycerol, hexanetriol, triethanolamine, pentaerythritol, sorbitol, sucrose and phenol-formaldehyde reaction products, amino-alcohols such as monoethanolamine and diethanolamine and polyamines such as ethylene diamine, hexmethylene diamine, diethylene triamine, tolylene diamine and diaminodiphenylmethane. With branched polymers of this type it is preferred that each group Z is terminated by a group $R^{10}$ as defined.

Examples of groups $ZXR^{10}$ are the following compounds containing one hydroxy group. The monomethyl, ethyl, butyl, phenyl ethers of ethylene, diethylene, triethylene or propylene glycols; aminoalcohols such as the N:N-dimethyl, diethyl, phenylmethyl or phenylethyl derivatives of ethanolamine or isopropanolamine, or N-hydroxyethylmorpholine; or hydroxyalkyl esters and amides such as 2-hydroxyethyl benzoate, N-acetyl-N-methyl ethanolamine or N-benzoyl-N-methyl ethanolamine. Examples of monohydric polyether alcohols, which are in general mixtures of products of different molecular weights, include the products of oxyalkylation with ethylene, propylene and butylene oxides or with mixtures thereof, of monohydric alcohols or phenols, secondary amines, carboxylic acids and mono-N-substituted carboxylic amides. Some specific examples of such preferred monohydric polyether alcohols which have been found of value are listed in the following table:

| Initiator | Alkylene Oxide | Molecular Weights of Derived Polyethers |
|---|---|---|
| Methanol | Ethylene oxide | 365, 528, 750 |
| Mixed hexadecyl and octadecyl alcohols | do | 368.6 |
| Methyl cellosolve | Propylene oxide | 354, 708 |
| Isooctanol (mixed isomers) | do | 292.4, 372, 419, 629, 980 |
| Triethylene glycol monomethyl ether | do | 698, 1542 |
| Benzyl alcohol | do | 410 |
| Isooctanol (mixed isomers) | Butylene oxide (mixed isomers) | 281 |
| Methyl cellosolve | do | 390 |
| n-Butanol | Mixture of ethylene and propylene oxides (1:1 by weight) | 332.7, 717, 1,510, 2,225 |
| Isooctanol (mixed isomers) | do | 600, 1,023, 1,529, 1,987 |
| Ethyl carbitol (Reg. Trade Mark) | do | 1,023, 1,510, 2,010 |
| Butyl cellosolve (Reg. Trade Mark) | do | 1,483 |
| Butyl carbitol | do | 698 |
| Benzyl alcohol | do | 406 |
| N:N-diethylamino-ethanol | do | 624, 1,135, 1,501 |
| Isooctanol (mixed isomers) | Mixture of ethylene and propylene oxides (1:2 by weight) | 1,493 |
| Ethyl carbitol | | 1,533 |
| Isooctanol (mixed isomers) | Mixture of ethylene and propylene oxides (2:1 by weight.) | 1,541 |
| Ethyl carbitol | | 1,509 |

Generally the weight ratio of the total oxyalkylene groups to the total weight of the polymer varies between about 0.15–0.70, depending on the properties and structure of the components and the properties desired in the copolymer; the range 0.25–0.50 is preferred.

Examples of branched polyoxyalkylene residues are trihydric polyethers of molecular weights up to about 10,000 obtained by oxyalkylation of glycerol, trimethylolpropane, 1:2:6-hexanetriol or pentaerythritol with ethylene oxides, propylene oxide or mixtures of ethylene and propylene oxides; oxyalkylation products from polyhydric phenols such as hydroquinone, resorcinol, 2:2-bis(4-hydroxyphenyl) propane or chloroglucinol; oxypropylated tolylenediamine of molecular weight about 400; oxyalkylated alkylenediamines where preferably all free hydroxy groups are terminated by $R^{10}$ groups.

The preparation of the copolymers of this invention by methods known "per se" will be apparent to those skilled in the art. Thus, in general two processes of manufacture may be used. One, applicable to many of our compounds, comprises copolymerising a compound of Formula A with a compound of Formula B. The methods of polymerisation, e.g. emulsion or solution polymerisation by a free radical mechanism or a cationic or anionic catalyst are also known from the prior art; the preferred and most convenient method depends on the specific co-mers selected. It is also known that certain mer-units A and B do not copolymerise readily or do so only at low rates. In these cases the difficulty may sometimes be overcome by copolymerisation with a third more readily polymerisable co-mer. Alternatively the second, generally preferable and more convenient process may be used, which comprises copolymerising precursors of the mer-units A and/or B which have reactive groups to form an intermediate copolymer to said reactive groups of which the desired non-polar component $R^1$ and/or the —$ZXR^{10}$ group or groups may be attached by subsequent reactions. Thus e.g. one may first copolymerise a given compound having a non-polar substituent $R^1$ such as an alkyl methacrylate with a suitable acid component such as itaconic acid or maleic anhydride; the resulting polymer is then reacted with a polyalkylene glycol whereby a portion or all of the free —COOH groups in the polymer intermediate become monoester-linked to the polyalkylene glycol. Other possible variations in the nature of the reactants and in the selection of a suitable reaction path would also suggest themselves to those skilled in the art.

Optionally polyvinyl ester or poly(alkyl acrylate) blocks or poly(alkyl methacrylate) blocks may be grafted on to the polyoxyalkylene blocks of our compounds. This may be accomplished by heating a polyoxyalkylene copolymer with a vinyl ester in the presence of a free radical producing catalyst, such as a peroxide, for example a diacyl or diaroyl peroxide, particularly dibenzoyl peroxide or an azo compound, particularly azodi-isobutyronitrile in the manner described by Kahrs and Zimmerman (Makromolekulare Chemie 1961, 58, 75).

It is preferred to carry out the polyoxyalkylation reaction in the presence of a catalyst of the type described in the prior art as effective in this general type of reaction, for example bases, acids, Friedel-Crafts halides, or metallic salts and complexes.

Particularly active catalysts are strong alkalis, especially alkali metal alkoxides such as sodium or potassium methoxide, or an alkali metal derivative of the monohydric alcohol which it is desired to react. Such alkali metal alkoxide catalysts are not, however, always completely satisfactory. This is particularly apparent when making block copolymers from hydrophilic polyesters of high molecular weight of the order of 1500 or higher. In such cases it is difficult, if not impossible, to obtain a homogeneous, single-phase product by the use of an alkoxide catalyst, and the mixture of products so obtained is usually ineffective as a surface-active additive for making polyurethane foams. It has been found that these difficulties may be avoided by using as catalysts certain metal salts, especially metal salts which are soluble in the reaction medium, such as carboxylic acid salts of divalent tin or lead, or of dialkyl tin. Examples of particularly suitable catalysts are stannous octoate, lead octoate and dibutyl tin dilaurate. The use of these preferred catalysts enables the preparation, without difficulty, of homogeneous condensates which are extremely active as surface-active additives for the manufacture of the foams of this invention. Furthermore, even in those cases where it is possible to make a homogeneous product by use of an alkoxide catalyst, it is frequently found that the use of the aforedescribed metal salt catalysts provides products which are more active, or more reproducible in their properties as additives for polyurethane foams, than similar compositions made with an alkoxide catalyst.

The catalysts are normally used in proportions of from 0.05 to 1.0% by weight of the total weight of reactants, although proportions outside this range may be used.

The reaction is normally carried out at temperatures of from 20° to 140° C., depending mainly on the catalyst used. It is usually convenient to carry out the reaction in a solvent, for example an aromatic hydrocarbon or a chlorinated aromatic hydrocarbon.

Certain of the copolymers of this invention are new compounds. Accordingly we also provide ternary copolymers consisting of co-mers A, B and C, wherein co-mer A is a vinyl ester of an alkanoic acid or a derivative of acrylic, methacrylic or itaconic acid; co-mer B is a derivative of acrylic, methacrylic, maleic, fumaric or itaconic acid, at least one of which co-mers A or B carries one or more long chain alkyl groups $R^1$ and one or more of which co-mers A or B carries a substituent —$ZXR^{10}$, and wherein co-mer C is a lower alkyl ester other than A or B of acrylic or methacrylic acid or a vinyl ester of a lower alkanoic acid, where $R^1$, Z, X and $R^{10}$ are as defined above, the said derivatives are esters or dialkylamides of the said monocarboxylic acids or diesters, esterdialkylamides, tetraalkyldiamides or cyclic N-alkyl carboximides of said dicarboxylic acids, the lower alkyl groups have 1 to 3 carbon atoms, the lower alkanoic acid has 2 to 4 carbon atoms and the weight of alkyl group $R^1$ is between 10 and 60%, and the weight of the polyoxyalkylene group Z is between 15 and 70% of the weight of the copolymeric additive and the proportion of co-mer C is up to 30 mole percent of the monomers forming the copolymer.

Our compounds have been found to be particularly valuable as additives in the manufacture of polyurethane foams, wherein they confer an exceptional degree of stability on the foaming mass prior to the cure of the foam. Thus the use of such additives enables low density foams with an excellent, uniform pore structure to be obtained, and in some systems increases the proportion of closed cells in the foam.

As a further feature of the present invention there is provided a process for the manufacture of foamed cellular polyurethane materials by the reaction of organic polyisocyanates with hydroxyl group-containing polymers containing at least two isocyanate reactive groups per molecule in the presence of water and/or a low boiling point liquid characterised in that there is incorporated as an additive in said process a copolymer of the present invention.

A particularly useful property of our copolymer is that, in contrast to many conventional silicone agents, they are stable in presence of the polyol (polyether) used as a polyurethane ingredient and that they do not hydrolyse on storage or after admixture to the polyurethane ingredients. This is of considerable commercial value as storage life is virtually indefinite and timing of the addition of the pore size control agent is no longer critical, so that the wastage of premixed materials, which may be incurred with silicones whenever there are plant shut-downs or delays in processing, is avoided.

Accordingly we also provide hydrolytically stable intermediates for preparing polyurethane foams, comprising a copolymer according to this invention, together with either a polyether or a polyester or a polyisocyanate composition. The copolymer-polyether blend or the copolymer-polyester blend may then later be reacted with polyisocyanate or, conversely, a copolymer-polyisocyanate blend may be reacted with either polyether or polyester in a known manner.

The polyurethane foams which are advantageously prepared in the presence of the copolymers of this invention may be prepared from the foam-forming ingredients fully described in the prior art. Such polyurethane products may be prepared for example from materials fully described in the prior art in the form of surface coatings, sheets, shaped articles or adhesive layers. Thus the hydroxyl group-containing polymer may be for example a polyester, polyesteramide or polyether, or mixtures thereof.

The polyesters or polyesteramides may be made for example from dicarboxylic acids and polyhydric alcohols and, as necssary, minor proportions of diamines or aminoalcohols. Suitable dicarboxylic acids include succinic, glutaric, adipic, suberic, azelaic and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, 2:3-butylene glycol, diethylene glycol, tetramethylene glycol, pentamethylene glycol, hexamethylene glycol, decamethylene glycol and 2:2-dimethyltrimethylene glycol. Other polyhydric alcohols containing more than two hydroxyl groups per molecule may be used, for example trimethylolpropane, trimethylolethane pentaerythritol and glycerol. Such compounds are included in varying amounts according to the desired rigidity of the products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxystearic acid and tricarballylic acid.

Examples of diamines and aminoalcohols that may be used to make polyesteramides include ethylene diamine, hexamethylene diamine, monoethanolamine, phenylene diamines and benzidene.

The polyesters and polyesteramides used according to the process of the present invention normally have molecular weight of from 200 to 5000, would predominantly hydroxyl end groups.

As examples of polyethers for use in the process of the present invention there may be mentioned hydroxyl-ended polymers and copolymers of cyclic oxides, for example 1:2-alkylene oxides such as ethylene oxide, epichlorhydrin, 1:2-propylene oxide, 1:2-butylene oxide and 2:3-butylene oxide, oxacyclobutane and substituted oxacyclobutanes, and tetrahydrofuran. Such polyethers may be linear polyether glycols as are prepared, for example, by the polymerisation of an alkylene oxide in the presence of a basic catalyst, such as potassium hydroxide, and a glycol or a primary monoamine. Alternatively there may be used branched polyethers prepared for example by the polymerisation of an alkylene oxide in the presence of a basic catalyst and a substance having more than two active hydrogen atoms per molecule, for example ammonia and polyhydroxy compounds such as glycerol, hexane triols, trimethylolethane, triethanolamine, pentaerythritol, sorbitol, sucrose and phenol-formaldehyde reaction products, aminoalcohols such as monoethanolamine and diethanolamine and polyamines such as ethylene diamine, hexamethylene diamine, diethylene triamine, tolylene diamine and diaminodiphenylmethane. Branched polyethers may also be produced by copolymerising a cyclic oxide of the type already mentioned with cyclic oxides having a functionality greater than two for example diepoxides, glycidol and 3-hydroxymethyloxacyclobutanes.

The polyethers used according to the process of the present invention normally have molecular weights of from 200 to 6000. Mixtures of linear and branched polyethers may be used if desired.

Examples of suitable polyisocyanates include aliphatic diisocyanates such as hexamethylene diisocyante, aromatic diisocyanates such as tolylene-2:4-diisocyanate, tolylene-2:6-diisocyanate, diphenylmethane-4:4'-diisocyanate, 3-methyldiphenylmethane-4:4'-diisocyanate, m- and p-phenylene diisocyanate, chlorophenylene 2:4-diisocyanate, naphthalene-1:5-diisocyanate, diphenyl-4:4'-diisocyanate, 4:4'-diisocyanate-3:3'-dimethyldiphenyl and diphenl ether diisocyanate and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenyl ether. Examples of other suitable organic polyisocyanates comprise the reaction products of an excess of a diisocyanate with polyhydric alcohols such as trimethylolpropane and uretedione dimers and isocyanurate polymers of diisocyanates for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

Suitable low-boiling point liquids that are chemically inert towards isocyanates and water and have boiling points not exceeding 75° C., preferably between −40° C. and 50° C. include for example fluorinated alkanes such as monofluorotrichloromethane, dibromo-difluoromethane, dichloromono-fluoromethane, dichlorotetrafluoroethane, monochlorodifluoromethane and difluorethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 200%, preferably from 50% to 125% by weight of the hydroxylic polymer.

Water is usually employed in amounts of from 1 to 10% by weight of the hydroxyl group-containing polymer, when this is used as the source of carbon dioxide blowing gas.

The preparation of the foamed, cellular polyurethanes may be carried out by the general methods fully described in the prior art. Thus the materials may be mixed continuously or discontinuously and the hydroxyl group-containing polymer may be first reacted with part or the whole of the organic polyisocyanate before the final reaction to give a foam is carried out in a second stage. However it is generally preferred to carry out the foam preparation in one stage only, by the simultaneous reaction of the foam-forming ingredients, namely, the hydroxyl group-containing polymer, the organic polyisocyanate and the water and/or the low boiling point liquid. This convenient one-stage process cannot be satisfactorily carried out with all hydroxyl group-containing polymers. In particular these polymers containing predominantly secondary hydroxyl end-groups do not normally give satisfactory foams using a one-stage process as defined above: using such polymers the foam-forming mass usually partially or wholly collapses with considerable loss of gas and the formation of unsatisfactory high density products. The one stage process gives particularly unsatisfactory results using polyethers having predominantly secondary hydroxyl end groups.

It has been found that the copolymers of this invention are especially valuable as foam-stabilising agents in the preparation of foams by the one stage process from polyethers having predominantly secondary hydroxyl end-groups.

Examples of secondary hydroxyl-ended polyethers include polymers and copolymers of 1:2-alkylene oxides such as propylene and butylene oxides. It is preferred to use predominantly secondary hydroxyl-ended polymers of propylene oxide, especially those with molecular weights of from 400 to 600.

The copolymers may be incorporated into the foam-forming mixture as such, or may first be mixed with any of the foam-forming ingredients with which they are not reactive and in which they are soluble for example the hydroxyl group-containing polymer or the diisocyanate and then added to the other foam-forming ingredients. The copolymers are normally incorporated in amounts of from 0.1% to 5%, preferably from 0.3% to 1% by weight of the weight of hydroxyl group-containing polymer, when used in making "one-shot" foams, that is foams made in one stage by the simultaneous reaction of hydroxyl group-containing polymer, polyisocyanate and water.

As described fully in the prior art polyurethane foams may be prepared using a variety of additives including in particular catalysts such as basic materials, for example tertiary amines, and soluble organic compounds of heavy metals, for example iron and manganese acetyl acetonate, dibutyl tin dilaurate and stannous octoate; mixtures of catalysts may often be used with advantage. Other additives include surface-active agents, for example oxyethylated phenols, fatty alcohols such as oleyl alcohol or sulphated methyl oleate, and alkyl or aryl polysiloxanes, flame-retardants such as β-trichlorethyl phosphate and antimony oxide, plasticisers such as tricresyl phosphate and dioctyl phthalate, colouring matters and fillers such as carbon black and silica and colour stabilisers and whitening agents. A further class of additives that may be added comprises antioxidants, for example tert-butyl-catechol and sterically hindered phenols.

The invention is illustrated but not limited by the following examples in which parts and percentages are by weight.

EXAMPLE 1

Polymer A

A mixture of 395 parts of light petroleum B.P. 100–120° C. and 395 parts of toluene was stirred and heated under reflux. A solution of 2.5 parts benzoyl peroxide in 8.5 parts butyl methacrylate, 102 parts stearyl methacrylate and 123 parts of the methacrylate of methoxypolyethyleneglycol of molecular weight 320 was added over a period of 5 hours to the refluxing solvent. 0.3 part of benzoyl peroxide was then added, and further quantities of 0.3 part were added after 2 hours and 5 hours respectively. Heating was continued for a further 3 hours. The solvents were removed under reduced pressure. There was thus obtained a solid copolymer of the composition indicated in Table I.

EXAMPLE 2

Polymer B 135 parts of stearyl methacrylate, 82 parts of the methacrylate of methoxypolyethyleneglycol of molecular weight 320, and 28.4 parts of butyl methacrylate were copolymerised in the presence of 3.3 parts of benzoyl peroxide under operating conditions similar to those used for making polymer A but only two additions of benzoyl peroxide, each of 0.3 part were made. The solvents were again stripped from the polymer under reduced pressure. There was thus obtained a copolymer of the composition indicated in Table I.

EXAMPLE 3

Polymer C

A solvent free copolymer of 67.5 parts of stearyl methacrylate, 28.4 parts of butyl methacrylate and 164 parts of the methacrylate of methoxypolyethyleneglycol of molecular weight 320 was prepared as described for polymer A. There was thus obtained a copolymer of the composition indicated in Table I.

EXAMPLE 4

Polymer D 94 parts of the methoxypolyethyleneglycol methacrylate above, 94 parts of lauryl methacrylate and 15 parts of ethyl acrylate were copolymerised with the aid of 4 parts of benzoyl peroxide as described for polymer C. The addition of monomers again took 5 hours but no further peroxide was added and heating was continued for a further 10 hours. There was thus obtained a copolymer of the composition indicated in Table I.

EXAMPLE 5

Polymer E 100 parts of 2-ethylhexyl acrylate, 10 parts of ethyl acrylate, 100 parts of the polyethyleneglycol methacrylate used in Example 1 and 4 parts of benzoyl peroxide were added over 5 hours to a refluxing mixture of equal parts by weight of toluene and light petroleum, B.P. 100–120° C. as in the preparation of polymer A. There was thus obtained a copolymer of the composition indicated in Table I.

EXAMPLE 6

Polymer F 100 parts of the polyethyleneglycol methacrylate used for making Polymer A, 100 parts of butyl acrylate and 10 parts of ethyl acrylate were copolymerised as in the preparation of polymer C. There was thus obtained a copolymer of the composition indicated in Table I.

EXAMPLE 7

Polymer G

A mixture of 60 parts of the methacrylate of methoxy-terminated polyethyleneglycol referred to in Example 1, 50 parts of ethyl acrylate and 4 of benzoyl peroxide was added at a constant rate over a period of 5 hours to a stirred, refluxing mixture of 300 parts toluene and 100 parts of light petroleum (boiling point 100–120° C.). Heating under reflux was continued for a further 10 hours. A solvent-free polymer of the composition given in Table I was then obtained as described in Example 1.

EXAMPLE 8

Polymer H

A solution of 50 parts of the methacrylate of methoxy-terminated polyethyleneglycol referred to in Example 1 and 2 parts of benzoyl peroxide in 220 parts of toluene was heated under reflux for 17 hours. Addition of 0.5 part benzoyl peroxide were made 1.5, 2.5 and 4 hours respectively from the time of commencing reflux. The solvent free homopolymer was obtained as described in Example 1.

EXAMPLE 9

Polymer I

A mixture of 212 parts of the fumaric acid diester of methoxyl terminated polyethyleneglycol of molecular weight 320, 127 parts of lauryl methacrylate, 6 parts of benzoyl peroxide and 100 parts of toluene was added at a uniform rate over a period of 4 hours to a mixture of 200 parts benzene and 400 parts of toluene which was heated and stirred under reflux. The reaction was allowed to continue for 54 hours when 2 parts of benzoyl peroxide were added and heating under reflux was continued for a further 24 hours. The solvents were removed under reduced pressure. There was thus obtained a copolymer of the composition indicated in Table I.

EXAMPLE 10

Polymer J

The procedure of Example 1 was repeated except that 0.65 part butan-1:3-diol dimethacrylate was included in the mixture of monomers polymerised. The resulting copolymer obtained by evaporation of the solvent was slightly cross-linked and had the composition given in Table I.

EXAMPLE 11

A mixture of 100 parts of oxypropylated tolylenediamine of molecular weight 460, 30 parts of tri-β-chloroethylphosphate and 64 parts of trichlorofluoromethane was blended with 1.0 part of the copolymer of Example 1, 0.5 part of dibutyl tin dilaurate and 10 parts of glycerol. Finally 180 parts of a di(4-isocyanatophenyl)methane composition was mixed in, stirred until foaming commenced and the foaming mixture poured into a mould. There was thus obtained a fine textured, rigid foam of density 2.0 lbs./ct. ft. and containing more than 90% closed cells.

EXAMPLE 12

A rigid polyurethane foam of fine even texture and density 2.8 lbs./cu. ft. and containing a high proportion of closed cells was prepared by mixing together 100 parts of oxypropylated trimethylolpropane of average molecular weight 315, 145 parts of crude 4,4′-diisocyanato-diphenylmethane, 25 parts of trichloromonofluoromethane, 15 parts of tri(beta-chloroethyl)phosphate, 1 part of N,N-dimethylcyclohexylamine, 0.2 part of dibutyl tin dilaurate and 1 part of the copolymer of Example 2.

EXAMPLE 13

Polymer K 50 parts of the copolymer B from Example 2 were stirred and heated at 80° C. under nitrogen whilst 40 parts of freshly distilled vinyl acetate containing 0.6 part of benzoyl peroxide were added dropwise over a period of 30 minutes. Stirring and heating to 90–100° C. under reflux were then continued for 3 hours. The mixture was allowed to cool to 20° C. after which all matter volatile up to 100° C. at 0.1 mm. pressure was removed by distillation. There was thus obtained 85.7 parts of a homogeneous clear oil that set to a waxy solid on cooling.

EXAMPLES 14 TO 17 INCLUSIVE

A polyurethane foaming composition was made up from commercially available ingredients as set out below:

| | Parts |
|---|---|
| "Daltolac" 60 (a polyether triol of M.W. 315) | 100 |
| Catalyst (dibutyl tin dilaurate) | 2 |
| Foam stabiliser | 1 |
| "Arcton" 11 (trichlorofluoromethane), blowing agent | 25 |
| "Suprasec" DN [1] | 144 |

[1] A diisocyanatodiphenylmethane composition containing a minimum of 85% of diisocyanatodiphenylmethane.

In experiments 14 to 23 inclusive the foam stabilizers were, respectively, the copolymers from Examples 1 to 10 inclusive and in experiment 27 it was the polymer from Example 13. The foam stabilizer was dissolved in "Suprasec" DN, all ingredients other than "Suprasec" DN were mixed and then the "Suprasec" DN was added under vigorous stirring and the composition was poured into an open mould. The foams were then examined as to density, evenness of pore structure, yield point and stress at yield under compression in both longitudinal and transverse direction, i.e. in the direction of and at right angles to the direction of the rise of the foam, and the strength and elongation at the break point under tension in both directions as stated above.

Three further identical experiments (Nos. 24, 25, 26) were carried out using equal quantities of commercially available silicone pore-size controlling agents, namely "L 520" (a block copolymer of polysiloxane and polyoxyalkylene units), "Silcocel" 380 (a block copolymer of polysiloxane and polyoxyalkylene units) and "Silicone DP 2529" (a siloxane block copolymer with polyethyleneoxyethanol), respectively, instead of the above listed copolymers. The copolymers of Examples 1 to 6 inclusive and of Examples 9, 10 and 13 produced foam of equally or more uniform texture having densities and properties under tension and compression comparable to or better than the control samples produced with silicone agents. Results are given in Table II. The foam made with the copolymer from Example 7 was more uneven in pore structure than the control experiments with silicone agents and rather unsatisfactory; the foam made using the homopolymer from Example 8 was completely unsatisfactory;

it had dense sections, large, very unevenly sized and spaced holes and was dark brown to black in appearance.

at yield under compression in both the longitudinal and the transverse directions i.e. in the direction of, and at

TABLE I

| Monomer | Example Number | | | | | | | | | |
|---|---|---|---|---|---|---|---|---|---|---|
| | 1 | 2 | 3 | 4 | 5 | 6 | 7 | 8 | 9 | 10 |
| | Molar proportion of monomer | | | | | | | | | |
| Butyl methacrylate | 0.06 | 0.2 | 0.2 | | | | | | | 0.06 |
| Stearyl methacrylate | 0.3 | 0.4 | 0.2 | | | | | | | 0.3 |
| Methoxypolyethylene glycol (M.W. 320) ester of methacrylic acid | 0.3 | 0.2 | 0.4 | 0.23 | 0.24 | 0.24 | 0.145 | (¹) | | 0.3 |
| Ethyl acrylate | | | | 0.15 | 0.1 | 0.1 | 0.5 | | | |
| Lauryl methacrylate | | | | | 0.37 | | | | 0.50 | |
| 2-ethylhexyl acrylate | | | | | | 0.54 | | | | |
| Methoxypolyethylene glycol (M.W. 320) diester of fumaric acid | | | | | | | | | 0.29 | |
| Butyl acrylate | | | | | | | | 0.78 | | |
| Butan-1:3-diol dimethacrylate | | | | | | | | | | 0.003 |

¹ Homopolymer.

| | | | Compression Tests ᵃ | | | | Tensile Tests ᵍ | | | | |
|---|---|---|---|---|---|---|---|---|---|---|---|
| | | | Longitudinal ᵇ | | Transverse ᶜ | | Longitudinal ᵇ | | Transverse ᶜ | | |
| Example Number | Polymer | Density ᵈ | Yield Point Per-cent | Stress at Yield (p.s.i.) | Yield Point Per-cent | Stress at Yield (p.s.i.) | T.S.ᵉ (p.s.i.) | E ᶠ | T.S.ᵉ (p.s.i.) | E ᶠ | Remarks |
| 14 | A | 3.02 | 7 | 59 | 7 | 36 | 80 | 11 | 69 | 14 | |
| 15 | B | 2.86 | 7.4 | 50 | 7.5 | 37 | 73 | 8 | 67 | 11 | |
| 16 | C | 2.67 | 7 | 45 | 6.6 | 30 | 76 | 13 | 65 | 14 | |
| 17 | D | 2.54 | 6.6 | 49 | 6.6 | 25 | 78 | 16 | 65 | 16 | |
| 18 | E | 2.97 | 6.3 | 59 | 6.8 | 37 | 81 | 13 | 71 | 16 | |
| 19 | F | 3.02 | 6.7 | 53 | 7.0 | 37 | 84 | 11 | 70 | 17 | |
| 20 | G | 2.81 | 6.0 | ʰ 36 | 7.8 | 35 | 68 | 14 | 66 | 13 | Pores uneven. |
| 21 | H | 2.85 | 5.5 | ⁱ 29 | 7.8 | 30 | 69 | 18 | 53 | 11 | Unsatisfactory pore structure. |
| 22 | I | 2.89 | 7.4 | 52 | 7.1 | 38 | 79 | 10 | 70 | 11 | |
| 23 | J | 2.67 | 6.4 | 53 | 6.7 | 30 | 76 | 15 | 63 | 15 | |
| 24 | | 2.91 | 6.7 | 58 | 6.4 | 30 | 84 | 12 | 71 | 13 | |
| 25 | | 3.22 | 6.0 | 66 | 6.4 | 37 | 68 | 8 | 76 | 13 | |
| 26 | | 3.0 | 6.2 | 49 | 7.7 | 31 | 84 | 5 | 55 | 7 | |
| 27 | K | 2.9 | 6.9 | 58 | 7.0 | 31 | 80 | 10 | 71 | 12 | |

ᵃ According to method of ASTM D 621–59T.
ᵇ Direction of rise of foam.
ᶜ At right angles to rise of foam.
ᵈ In lb./ft.³
ᵉ Tensile strength.
ᶠ Percent elongation to break.
ᵍ According to method of ASTM 1623–59T.
ʰ Low.
ⁱ Very low.

EXAMPLE 28

Polymer L

A solution of 53 parts of di-n-octyl itaconate, 75 parts of the itaconate diester of methoxy-polyethylene glycol of molecular weight 320 and 1 part of azobisisobutyronitrile in 200 parts of benzene was heated under reflux with stirring. Additions of 1 part of azobisisobutyronitrile each were made after periods of 6, 24, 48 and 72 hours respectively from the start of the experiment; the total period of heating under reflux was 96 hours. The solvent was stripped from the solution by distillation under reduced pressure.

EXAMPLE 29

Polymer M

A solution of 1 part of azobisisobutyronitrile in 66 parts of 2-ethoxyethyl methacrylate and 42 parts of lauryl methacrylate was added dropwise over a period of one hour to a stirred mixture of 100 parts of benzene and 100 parts of toluene heated under reflux. Heating and stirring were continued for a further 19 hours when a determination of the solids content of the solution showed that the polymerisation had gone beyond 95% completion. The solvent-free copolymer was obtained as described above.

EXAMPLES 30 AND 31

A polyurethane foaming composition was made up from commercially available ingredients as set out for Examples 14 to 23 inclusive with the exception that 1 part of each of the polymers L and M respectively was used as the foam stabiliser. The foams were then examined as to density, evenness of pore structure, yield point and stress at right angles to the rise of the foam. The results of these tests are presented in Table III.

The foams produced were of equal or more uniform texture and had densities and properties under compression coparable to those found in Examples 24, 25 and 26 using silicone foam stabilisers of the prior art.

TABLE III

| | | | Compression Tests ᵃ | | | |
|---|---|---|---|---|---|---|
| | | | Longitudinal ᵇ | | Traverse ᶜ | |
| Example Number | Polymer | Density ᵈ | Yield Point percent | Stress at yield (p.s.i.) | Yield Point, percent | Stress at yield (p.s.i.) |
| 30 | L | 3.20 | 6.4 | 56 | 6.9 | 35 |
| 31 | M | 3.14 | 6.6 | 50 | 6.9 | 33 |

ᵃ According to method of ASTMD 1621–59T.
ᵇ Direction of rise of foam.
ᶜ At right angles to rise of foam.
ᵈ In lb./ft.³

EXAMPLE 32

Polymer N

A solution of 53.5 parts of the methacrylate of methoxy polyethylene glycol of molecular weight 1300 (hereinafter referred to as Polymer O) and 2 parts benzoyl peroxide in 46.5 parts butyl acrylate, 80 parts of butanol and 25 parts of Cellosolve acetate (2-ethoxyethylacetate) was added at a uniform rate during 5 hours at a stirred refluxing mixture of 200 parts butanol and 95 parts Cellosolve acetate. Then one further part of benzoyl peroxide was added and the heating under reflux was continued for another 11 hours. The solvents were removed under reduced pressure.

EXAMPLE 33

Polymer P

A solution of 42 parts of Polymer O and 2 parts of benzoyl peroxide in 37.2 parts of ethyl acrylate, 80 parts of butanol and 70 parts of Cellosolve acetate was added at a uniform rate over a period of 5 hours to a stirred reflux mixture of 160 parts of butanol and 95 parts of Cellosolve acetate. A further 1.5 parts of benzoyl peroxide was added 1.5 hours after the monomer feed was completed and heating under reflux was continued for 7 hours; total reaction time was 13.5 hours. The polymeric stabiliser was freed of solvent as described above.

EXAMPLE 34

Polymer Q

A solution of 61 parts of Polymer O, 41 parts of stearyl methacrylate and 2 parts benzoyl peroxide in 100 parts of Cellosolve acetate, 10 parts of butanol, 20 parts of toluene and 20 parts of petroleum ether (B.P. 100–120° C.) was added at a uniform rate over one hour to 200 parts of butanol stirred and heated under reflux. Three hours after the addition was complete 1 part of benzoyl peroxide was added, and heating under reflux was continued for a further 16 hours. Solvent was then stripped from the polymer as described above.

EXAMPLE 35

Polymer R

A solution of 61 parts of Polymer O, 39 parts of lauryl methacrylate and 2.5 parts of benzoyl peroxide in 100 parts of Cellosolve acetate, 10 parts of butanol, 20 parts of toluene and 20 parts of petroleum ether was added at a uniform rate over a period of one hour to 200 parts of butanol stirred and heated undex reflux. One part of benzoyl peroxide was added 3 hours after the original feed had finished and heating under reflux was continued for a further 16 hours. The polymer was obtained free of solvent as described in the earlier examples.

EXAMPLE 36

Polymer S 3.5 mole of ethylene oxide and 2.5 mole of propylene oxide were mixed and condensed on to 1 mole of n-butanol in the presence of sodium hydroxide catalyst, and the resulting polyether alcohol was converted to its methacrylate ester by the process of Example No. 7 of U.S. Patent Specification No. 2,815,369. 63 parts of this methacrylate, 32.4 parts of stearyl acrylate, 4 parts of ethyl acrylate and 2 parts of benzoyl peroxide were mixed to form a homogeneous solution, and the resulting mixture added at a constant rate over 4 hours to a stirred refluxing mixture of 200 parts of toluene and 200 parts of petroleum ether (B.P. 100–120° C.). One further part of benzoyl peroxide was then added and heating under reflux was continued for 16 hours. Determination of the solids content of the resulting solution showed that a 95% yield of polymer had been obtained. The solvent-free polymer was then isolated as above described.

EXAMPLE 37

Polymer T

A solution of 2.5 parts benzoyl peroxide in 61 parts of the methacrylate of methoxy-polyethyleneglycol of molecular weight 320, and 41 parts of lauryl methacrylate in a mixture of 20 parts of toluene, 20 parts of petroleum ether (B.P. 100–120° C.), 15 parts of butyl acetate and 15 parts of butanol was added at a uniform rate over a period of one hour to a stirred refluxing mixture of 100 parts of petroleum ether (B.P. 100–120° C.) and 100 parts of toluene. 3 hours after the addition had been completed, 1 part of benzoyl peroxide was added and the heating under reflux continued for 16 hours. The polymeric stabiliser was obtained solvent-free in the manner described in earlier examples.

EXAMPLE 38

Polymer U

A solution of 2.5 parts benzoyl peroxide, 71 parts of the methacrylate of methoxypolyethylene glycol of molecular weight 320, and 42 parts of stearyl methacrylate in 50 parts of toluene and 20 parts of petroleum ether (B.P. 100–120° C.) and 10 parts of butanol was added over a period of one hour to a mixture of 100 parts of toluene and 100 parts of petroleum ether (B.P. 100–120° C.) stirred and heated under reflux. An addition of benzoyl peroxide was made and the polymerisation was completed as described in Example 37.

EXAMPLES 39–45 INCLUSIVE

Polyurethane foaming compositions were made up as described in Examples 14–27 inclusive except that one copolymer from Examples 32 to 38 inclusive was used as the foam stabiliser in each of the experiments 39 to 45 respectively. With the exception of Example 40 in which polymer P had been used, the foamed polyurethane produced in these examples was at least equal in performance to that made with the aid of the silicon agents of the prior art (Examples 24, 25, 26) when evaluated as to uniformity of texture, density and properties under tension and compression. The foam from Example 40 was unsatisfactory, and had a non-uniform pore structure.

EXAMPLE 46

130 parts of itaconic acid, 260 parts of methoxy polyethylene glycol of molecular weight 320, 192 parts of n-octanol, 15 parts of para-toluene-sulfonic acid and 1500 parts of toluene were charged into a glass reaction vessel fitted with a stirrer, Dean and Stark trap and condenser. The reactants were heated and stirred under reflux for 36 hours; the water formed in the esterification was removed by means of the Dean and Stark apparatus. The contents of the reactor were allowed to cool to ambient temperature and washed in turn with 100 parts of 50% (w./w.) aqueous sodium hydroxide solution, and with 2 portions each of 200 parts of a saturated solution of sodium chloride in water. The resulting solution was stirred with anhydrous sodium sulphate, decanted from the solid, and freed of toluene by distillation under reduced pressure to yield the mixed ester as a viscous liquid.

A solution of 100 parts of this mixed itaconate ester and 2 parts azobisisobutyronitrile in 200 parts of benzene was heated under reflux. Additions of 1 part of azobisisobutyronitrile each were made at 4, 8, 24, 28, 32, 48, 52 and 56 hours respectively after the start of the experiment; the total time of heating the mixture was 72 hours. The solvent-free polymer was then obtained as described in the earlier examples.

EXAMPLE 47

A solution of 52 parts of di Cellosolve (registered trademark) fumarate, 51 parts of lauryl methacrylate and 1 part of azobisisobutyronitrile in 100 parts of toluene and 100 parts of petroleum ether (M.P. 100–120° C.) was heated under reflux. Additions, each of 0.5 part of azobisisobutyronitrile were made 2, 4, 6, 8, 10 and 23 hours respectively after start of the polymerisation, the total reaction time being 26 hours. The resulting solution was heated (up to 120° C.) under reduced pressure (0.05 mm. mercury) to give a high yield of the copolymer.

EXAMPLE 48

A suspension of 71.5 parts of itaconic acid in 500 parts of toluene containing 5 parts of p-toluenesulphonic acid was esterified with a mixture of 178 parts of lauryl alcohol and 178 parts of methoxypolyethyleneglycol of molecular weight 1300 as described in Example 46.

A solution of 100 parts of this mixed ester and 2 parts of azobisisobutyronitrile in 200 parts of benzene was heated under reflux with stirring. Additions of 1 part of azobisisobutyronitrile were made as in Example 28 and again the total period of heating under reflux was 96 hours. The polymeric product was obtained solvent-free as described in the earlier examples.

EXAMPLE 49

A mixture of 11.2 parts of itaconic anhydride, 26.9 parts of dinonylamine and 150 parts of toluene was warmed at about 50° C. for 10 minutes in a glass reactor fitted with a stirrer and reflux condenser. Then 27 parts of stearyl alcohol and 1 part of paratoluenesulphonic acid were added and the reactor was fitted with a Dean and Stark apparatus. Stirring and heating under reflux were resumed and continued for 20 hours with continuous removal of the water of reaction via the Dean and Stark apparatus. The contents of the reactor were cooled to ambient temperature, washed in succession with 20 parts of 10% w./w. aqueous sodium hydroxide solution, 20 parts of water, and 2 portions each of 25 parts of saturated aqueous sodium chloride solution. The toluene was removed from the esteramide by distillation under reduced pressure.

A solution of 50 parts of this esteramide, 1 part of azobisisobutyronitrile and 50 parts of the itaconic acid diester of methoxypolyethyleneglycol of molecular weight 320 in 200 parts of benzene was heated under reflux with stirring. Additions of 1 part of azobisisobutyronitrile each were made 4, 8, 24, 28, 32, 48, 52 and 56 hours respectively after the start of the experiment; the total time of heating the mixture was 72 hours. The solvent-free polymeric pore size control agent was obtained as described in the earlier experiments.

EXAMPLE 50

A mixture of 154 parts of ethylene oxide and 145 parts of propylene oxide was condensed on to 74 parts of n-butanol in the presence of sodium hydroxide catalyst. A glass reactor fitted with a Dean and Stark apparatus, reflux condenser and stirrer was used for the next part of the experiment. 65 parts of itaconic acid, 93 parts of the polyether alcohol described above in this example, 139.5 parts of lauryl alcohol, 10 parts of para-toluenesulphonic acid 1500 parts of toluene were charged into the reactor and heated an stirred under reflux for 14 hours with continuous removal of water via the Dean and Stark apparatus. The contents of the reactor were allowed to cool, washed with 50 parts of a 50% w./w. solution of caustic soda, 100 parts of saturated brine, and then allowed to stand over 100 parts of anhydrous sodium sulphate. The resulting solution was decanted from the solid, and the ester product was obtained after the toluene had been removed under reduced pressure.

A solution of 100 parts of this mixed itaconic acid ester and 2 parts of azobisisobutyronitrile in 200 parts of benzene was heated under reflux. The polymerisation was completed and additions of azobisisobutyronitrile were made as in Example 46. 50 parts of this polymer of the mixed itaconic acid ester were stirred and heated at 80° C. under nitrogen whilst a solution of 0.5 part of benzoyl peroxide in 30 parts of Cellosolve methacrylate and 5 parts of methyl methacrylate was added dropwise over a period of 30 minutes. Stirring and heating to 90–100° C. under reflux were then continued for 3 hours. The mixture was allowed to cool to 20° C. after which all matter volatile up to 100° C. at 0.1 mm. mercury pressure was removed by distillation. There was thus obtained 80 parts of a homogeneous clear oil that set to a waxy solid on cooling.

EXAMPLES 51–55 INCLUSIVE

Polyurethane foaming compositions were made up as described in Examples 14–27 inclusive except that one copolymer from Examples 46–50 inclusive was used as the foam stabiliser in each of the experiments 51–55 inclusive. The foamed polyurethane produced in these examples was at least equal in performance to those made with the aid of the silicone agents of the prior art (Examples 24, 25, 26) when evaluated as to uniformity of texture, density and properties under tension and compression.

EXAMPLE 56

A solution of 36.5 parts of the diester of methoxypolyethylene glycol (molecular weight 320) with fumaric acid in a mixture of 100 parts toluene and 100 parts methyl ethyl ketone was heated and stirred under reflux. A solution of 31 parts of vinyl stearate, 8.6 parts of vinyl acetate and 1 part of azobisisobutyronitrile in 50 parts of methyl ethyl ketone was added at a uniform rate over a period of four hours to the above solution heated under reflux. When the addition was complete further 0.2 part of azobisisobutyronitrile were added to the reaction mixture and heating and stirring under reflux were continued for a further four hours. The solvent-free polymer was then isolated by the procedure described in Example 1.

EXAMPLE 57

800 parts of propylene oxide were condensed on to 190 parts of 2-ethoxyethanol in the presence of sodium hydroxide catalyst and the resulting polyether alcohol was converted to its methacrylate ester by the process of Example 7 of U.S. Patent Specification No. 2,815,369. A solution of 132.5 parts of this methacrylate ester and 3 parts of benzoyl peroxide in 71 parts of butyl methacrylate and 6 parts of dodecyl mercaptan was added at a uniform rate over a 1.5 hours period to 620 parts of isopropanol which was heated and stirred under reflux throughout this period. When this addition was complete, 0.2 part of benzoyl peroxide were added and heating and stirring under reflux was continued for 10 hours with further quantities of 0.2 part of benzoyl peroxide being introduced at 2.5 hourly intervals. The solvent-free polymer was then obtained as in Example 1.

EXAMPLE 58

A copolymer of 159 parts of the polyether methacrylate described in Example 57, 101.4 parts of stearyl methacrylate and 7.6 parts of butyl acrylate was prepared by the process described in Example 1.

EXAMPLE 59

The process of Example 36 was repeated except that only 43 parts of the methacrylate of the polyether alcohol were used in making the copolymer; the quantities of the other reactants remained unchanged. The polymer was isolated as described in Example 36.

EXAMPLE 60

A solution of 33 parts of ally lauryl prop-2-enylphosphonate and 30.3 parts of the methacrylate of diethylene glycol monoethyl ether in 60 parts of beta, beta'-dichlorodiethyl ether containing 1.5 parts of di-tert.butyl peroxide was heated for 8 hours at 150° C. Additions of 0.5 part of the peroxide to the reaction mixture were made at 2 hourly intervals. The solvent-free polymer was obtained as in Example 1.

EXAMPLES 61–65 INCLUSIVE

Polyurethane foaming compositions were made up as described in Examples 14–27 except that one copolymer from Examples 56–60 inclusive was used as the foam stabiliser in each of the Experiments 61–65 inclusive. The foamed polyurethanes produced were at least equal in performance to those made with the aid of the silicone agents of the prior art (Examples 24, 25, 26) when evaluated as to uniformity of texture, density and properties under tension and compression.

I claim:

1. In the process of preparation of a polyurethane foam by reaction of an organic polyisocyanate and a polyol under foaming conditions the improvement which comprises employing in the foaming process as a pore size controlling surfactant which is a copolymer of at least one unsaturated compound A of the formula

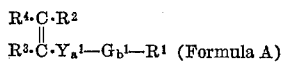
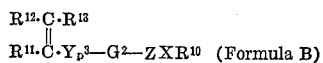

and a copolymerizable compound B of the formula

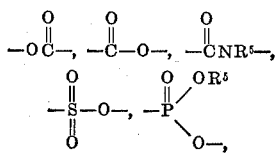

wherein $G^1$ is —O—,

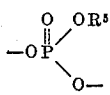

or

$R^2$, $R^3$, $R^4$ $R^{11}$, $R^{12}$, and $R^{13}$ are hydrogen or hydrocarbon radicals provided, however, that in compounds A as well as in B at least one of the substituents attached to the olefinic carbon atoms is hydrogen and not more than one is aryl or cycloalkyl; and wherein, whenever —$G_b{}^1R^1$ stands for

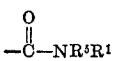

or

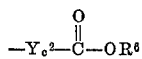

$R^2$ may also be

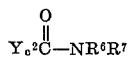

or

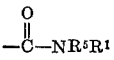

and, whenever —$G_b{}^1$—$R^1$ stands for

$R^2$ may also be

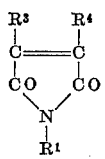

and $R^5$ then stands for a direct bond to the latter forming a cyclic dicarboximide of the formula

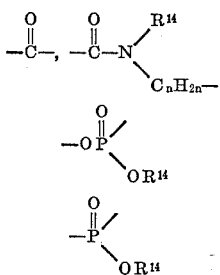

and wherein, whenever $R^2$ and $R^4$ are hydrogen, $R^3$ may also be —$CH_2 \cdot CONR^8R^9$ or —$CH_2COOR^9$; and wherein $G^2$ is

or

and wherein, whenever $G^2$ stands for

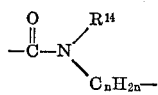

or

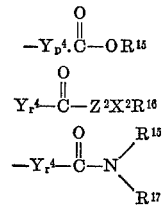

$R^{13}$ may also be

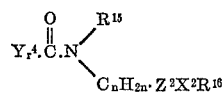

or

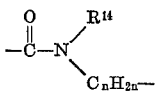

and wherein, whenever —$Y_p{}^3$—$G^2$ stands for

$R^{13}$ may also be

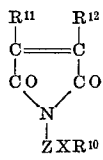

and $R^{14}$ is then a direct bond linking the latter to form a cyclic dicarboximide of the formula

and wherein, whenever $R^{12}$ and $R^{13}$ are hydrogen, $R^{11}$ may also be —$CH_2 \cdot COOR^{19}$, —$CH_2 \cdot CONR^{19}R^{20}$,

—$CH_2COOZ^2X^2R^{16}$ or

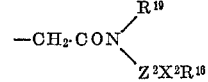

and wherein $R^5$ to $R^9$ inclusive, $R^{14}$, $R^{15}$, $R^{17}$, $R^{18}$, $R^{19}$, $R^{20}$ and $R^1$, which may all be the same or different, are hydrocarbon radicals at least one of which is an alkyl group having 4 or more carbons; and wherein $Y^1$, $Y^2$, $Y^3$ and $Y^4$, which may be the same or different, are alkylene bridges; and wherein indices $a$, $b$, $c$, $p$ and $r$, which may be the same or different, are zero or 1 and $n$ is an integer between 1 and 5; and wherein Z and $Z^2$, which may be the same or different, are polyoxyalkylene residues each of which may be a linear or branched homopolymer, a random copolymer or a block copolymer; and wherein X and $X^2$, which may be the same or different are —O— or —$NR^{18}$—; and $R^{10}$ and $R^{16}$ are an alkyl, cycloalkyl, aryl, aralkyl or acyl group and hydrocarbon radicals are alkyl, alkenyl, cycloalkyl, aryl, alkaryl or aralkyl and wherein the weight of the long chain alkyl group is between 10 and 60% of the total weight of the pore-size controlling additive and the weight of the polyoxyalkylene residue is between 15 and 70% of the total weight of the pore-size controlling additive.

2. A polyurethane foaming composition comprising a polyisocyanate or a polyhydroxyl polymer and a pore-size controlling surfactant which is a copolymer of at least one unsaturated compound A and a copolymerizable compound B as defined in claim 1 and wherein the weight of the long chain alkyl group is between 10 and 60% of the total weight of the pore-size controlling additive and the weight of the polyoxyalkylene residue is between 15 and 70% of the total weight of the pore-size controlling additive.

3. A polyurethane foaming composition as claimed in claim 2 wherein compound A is an ester or dialkylamide of acrylic, methacrylic, itaconic or crotonic acid and compound B is an ester or dialkylamide of acrylic, methacrylic, methacrylic, maleic, fumaric, itaconic, citraconic or mesaconic acid.

4. A polyurethane foaming composition as claimed in claim 2 wherein the aliphatic substituent of at least 4 carbon atoms is a long chain alkyl radical having at least 12 carbons in the chain.

5. A polyurethane foaming composition as claimed in claim 2 wherein in addition to compounds A and B the pore-size controlling additive comprises at least one copolymerisable ethylenically unsaturated co-mer in an amount up to 30 mole percent of the total copolymer.

6. In the process for the manufacture of foamed cellular polyurethane materials by the reaction of organic polyisocyanates with hydroxyl group-containing polymers containing at least two hydroxyl groups per molecule in the presence of water and/or a low boiling point liquid the improvement which consists of incorporating as a pore-size controlling additive in said process a copolymer as defined in claim 2.

References Cited

UNITED STATES PATENTS

| 3,085,983 | 4/1963 | Hardy | 260—2.5 |
| 3,270,032 | 8/1966 | Erner | 260—2.5 XR |
| 3,376,236 | 4/1968 | Erner | 260—2.5 |

OTHER REFERENCES

Walling, Free Radicals in Solution, John Wiley & Sons, New York (1957), pp 148, 149, and 156.

DONALD E. CZAJA, Primary Examiner

M. J. WELSH, Assistant Examiner

U.S. Cl. X.R.

260—23, 901